United States Patent [19]
Clark et al.

[11] Patent Number: 5,526,945
[45] Date of Patent: Jun. 18, 1996

[54] STORAGE RACK HAVING SUPPORT BEAM WITH CHANNEL PROFILE AND INCLINDED SURFACE

[75] Inventors: William L. Clark, Pinehurst, N.C.; William T. Guiher, Greenbrier, Tenn.

[73] Assignee: Unarco Material Handling, Inc., Springfield, Tenn.

[21] Appl. No.: 341,749

[22] Filed: Nov. 18, 1994

Related U.S. Application Data

[60] Division of Ser. No. 95,607, Jul. 21, 1993, Pat. No. 5,368,174, which is a continuation-in-part of Ser. No. 926,458, Aug. 7, 1992, abandoned.

[51] Int. Cl.$^6$ ........................................... A47F 5/00
[52] U.S. Cl. ........................ 211/183; 40/642; 211/191
[58] Field of Search .................... 211/183, 186, 211/187, 189, 191, 192; 40/642, 299; 108/107, 108, 109; 169/5, 16, 64

[56] References Cited

U.S. PATENT DOCUMENTS

| | | |
|---|---|---|
| 1,348,952 | 8/1920 | Landry . |
| 1,857,552 | 5/1932 | Komorous . |
| 2,809,074 | 10/1957 | McDonald . |
| 3,126,101 | 3/1964 | Katterjohn ........................ 211/176 |
| 3,278,043 | 10/1966 | Kimpton ........................ 211/191 |
| 3,297,075 | 1/1967 | Howell et al. ........................ 160/19 |
| 3,327,870 | 6/1967 | Fairchild, Jr. ........................ 211/183 |
| 3,520,345 | 7/1970 | Lillibridge et al. . |
| 3,539,108 | 11/1970 | Lillibridge et al. . |
| 3,561,608 | 2/1971 | Weider ........................ 211/176 |
| 3,608,220 | 9/1971 | Fryrear ........................ 40/125 H |
| 3,720,268 | 3/1973 | Seiz ........................ 169/16 X |
| 3,727,694 | 4/1973 | Dudzik . |
| 3,797,671 | 3/1974 | Sebilleau et al. ........................ 211/191 |
| 3,889,408 | 6/1975 | Offner ........................ 40/10 R |
| 3,900,112 | 8/1975 | Azzi et al. ........................ 211/148 |
| 3,999,875 | 12/1976 | Simon ........................ 403/186 |
| 4,140,224 | 2/1979 | Celeste ........................ 211/148 |
| 4,178,994 | 12/1979 | Ito et al. ........................ 169/52 |
| 4,299,327 | 11/1981 | Thauer ........................ 211/134 |
| 4,372,451 | 2/1983 | Rasmussen et al. ........................ 211/187 |
| 4,401,165 | 8/1983 | Gutermuth et al. . |
| 4,418,757 | 12/1983 | Merkel . |
| 4,484,634 | 11/1984 | Swanson et al. . |
| 4,509,652 | 4/1985 | Arney ........................ 211/126 |
| 4,541,675 | 9/1985 | Everett ........................ 312/257 R |
| 4,582,987 | 4/1986 | Bianco ........................ 235/486 |
| 4,688,341 | 8/1987 | Castel ........................ 40/5 |
| 4,708,252 | 11/1987 | Azzi ........................ 211/192 |
| 4,729,484 | 3/1988 | McConnell ........................ 211/183 |
| 5,044,104 | 9/1991 | Hopperdeitzel ........................ 40/642 |
| 5,094,350 | 3/1992 | Smock ........................ 211/59.2 |
| 5,115,920 | 6/1992 | Reilley et al. ........................ 235/375 |
| 5,160,051 | 11/1992 | Bustos ........................ 211/59.2 |
| 5,197,215 | 3/1993 | Torsleff ........................ 40/642 |
| 5,368,174 | 11/1994 | Clark et al. ........................ 211/183 |
| 5,386,917 | 2/1995 | Clark et al. . |

FOREIGN PATENT DOCUMENTS

| | | |
|---|---|---|
| 379058 | 11/1908 | France . |
| 1486500 | 5/1967 | France . |
| 3513199A1 | 10/1986 | Germany . |
| 1087133A | 4/1984 | U.S.S.R. . |
| WO91/05324 | 4/1991 | WIPO . |

*Primary Examiner*—Alvin C. Chin-shue
*Assistant Examiner*—Korie H. Chan
*Attorney, Agent, or Firm*—Dressler, Goldsmith, Shore & Milnamow, Ltd.

[57] ABSTRACT

A support beam for a storage rack has a tubular profile, which defines a ledge opening upwardly and inwardly, and which defines a generally flat, indicia-receiving surface facing outwardly and either downwardly or upwardly at an angle from about 20° to about 70° relative to a vertical plane. Alternatively, the tubular profile may define two such surfaces defining an obtuse angle relative to each other, namely an upper surface at an angle from about 20° to about 45° relative thereto and a lower surface at an angle from about 45° to about 70° relative thereto, or a generally arcuate, indicia-receiving surface having a suitable measurement. The indicia-receiving surface enables a person who is standing, or who is sitting on a lift truck, to have a generally perpendicular line of sight to such surface. The support beam may also be used in combination with a properly positioned fire extinguishing device to extinguish a fire in a supported load. When the fire extinguisher is activated, the fluid that is discharged impinges off the indicia-receiving surface, which may be inclined or curved, and onto the load.

3 Claims, 4 Drawing Sheets

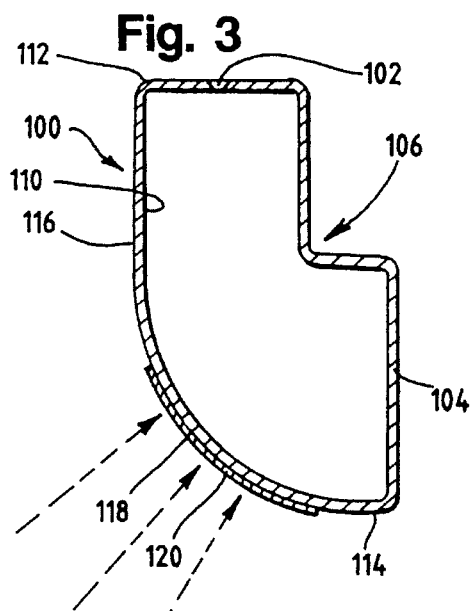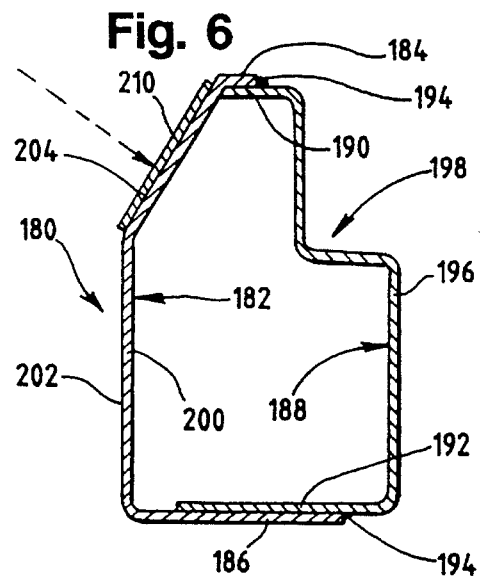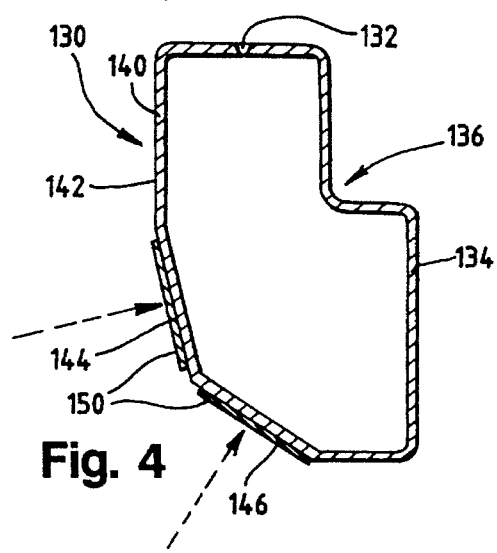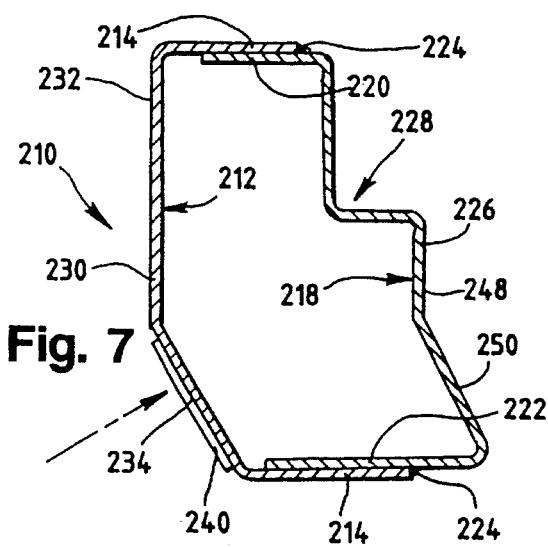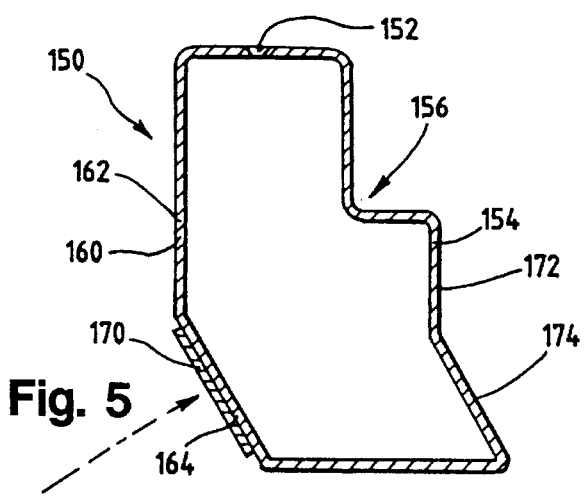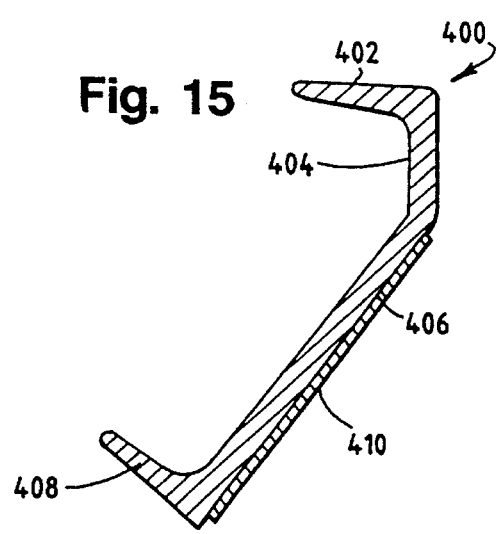

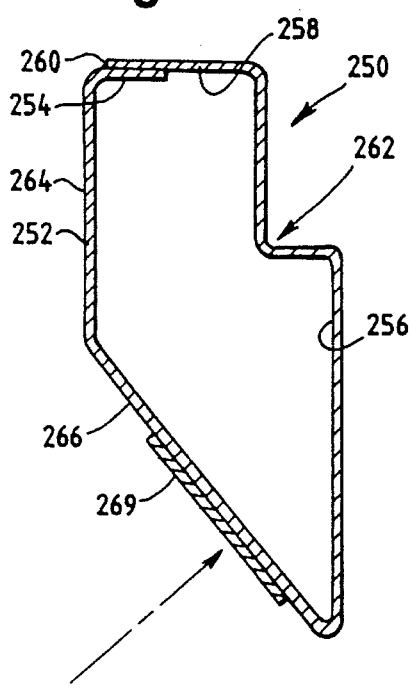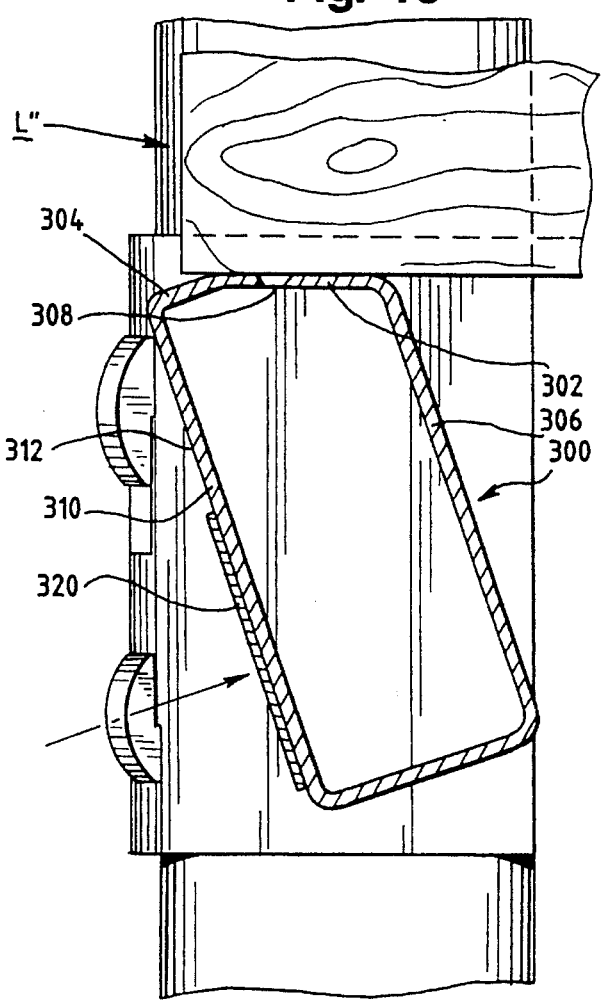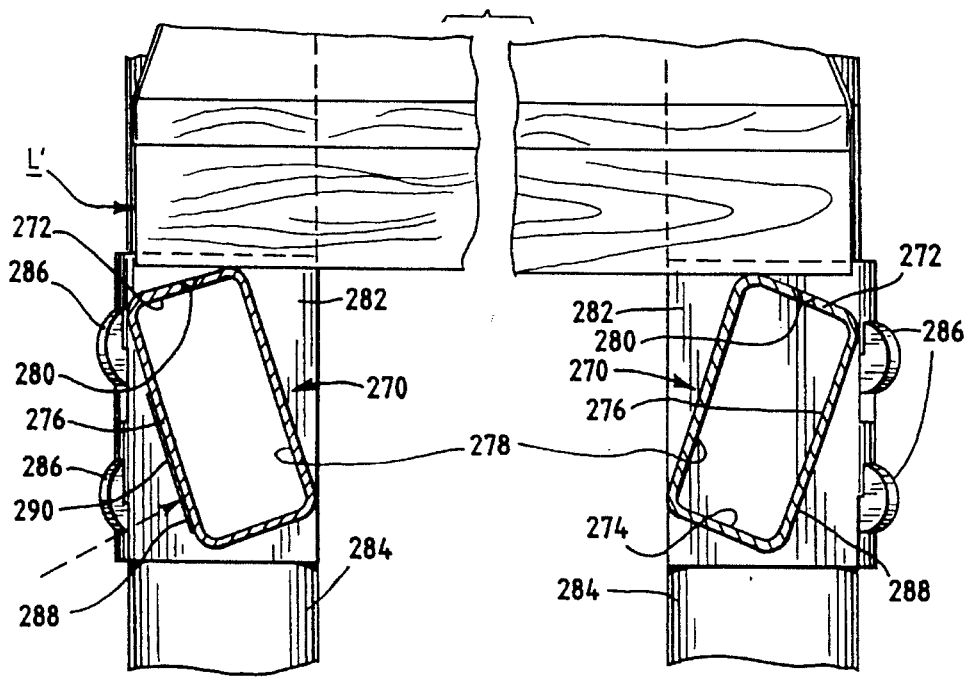

Fig. 12
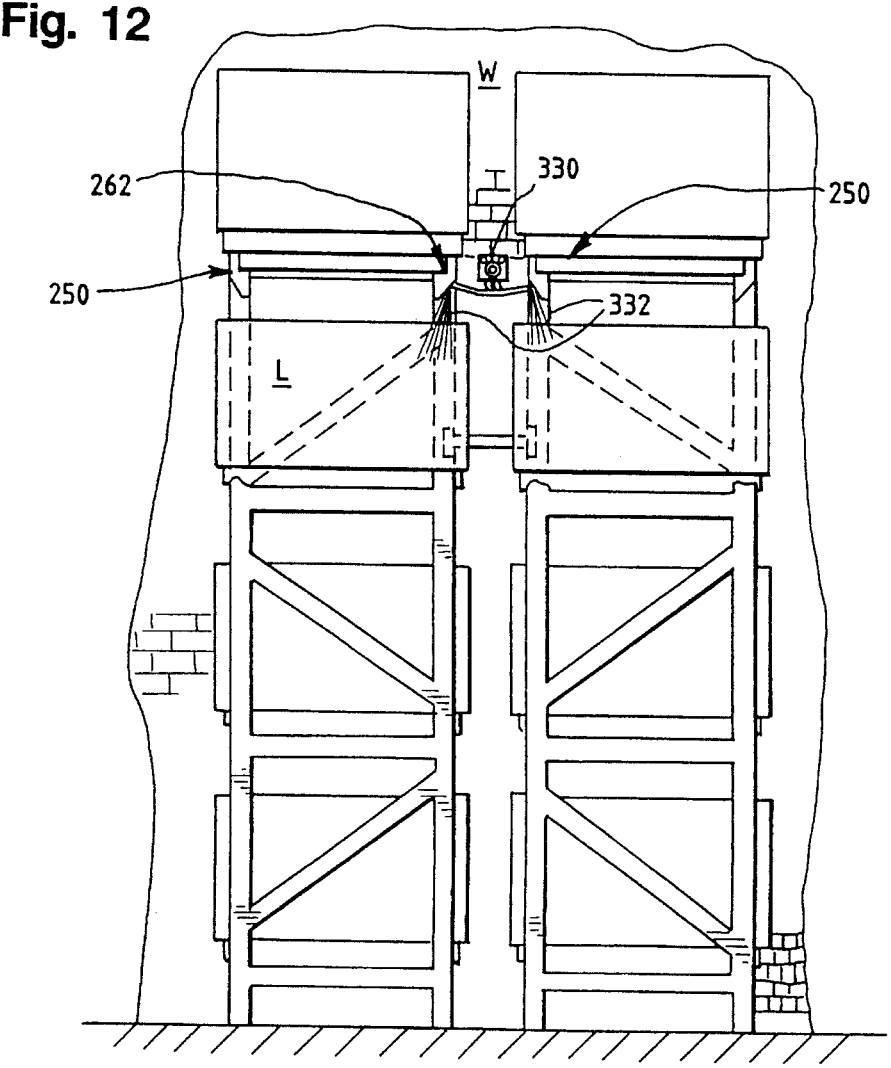
Fig. 13
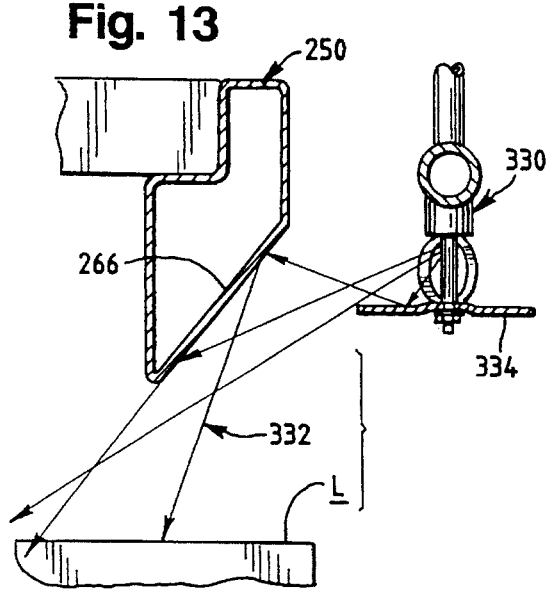
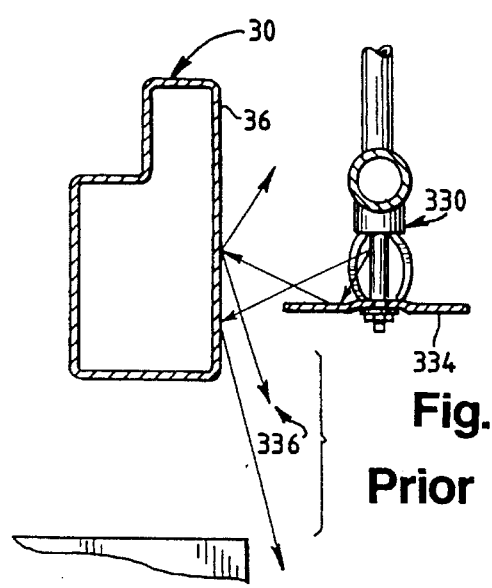
Fig. 14 Prior Art

STORAGE RACK HAVING SUPPORT BEAM WITH CHANNEL PROFILE AND INCLINDED SURFACE

CROSS-REFERENCE TO RELATED APPLICATION

This application is a division of U.S. patent application Ser. No. 08/095,607 filed Jul. 21, 1993 now U.S. Pat. No. 5,368,174, as a continuation-in-part of U.S. patent application Ser. No. 07/926,458 filed Aug. 7, 1992 now abandoned.

TECHNICAL FIELD OF THE INVENTION

This invention pertains to a support beam having a load-supporting surface for supporting a load, for a storage rack of a type used to store pallet loads and other loads. The support beam has an indicia-receiving surface adapted to receive machine-readable indicia, human-readable indicia, or both, as on a label applied to such surface. The indicia-receiving surface is inclined or curved so as to enable such indicia at a high or low elevation relative to a person seeking to read such indicia to be easily read.

The support beam of this invention may also be used with a fire extinguisher device that is located at generally the same elevation as the support beam. If a fire occurs, the inclined or curved indicia surface deflects a fire extinguishing fluid, such as water, onto a burning load and the fire is extinguished quickly.

BACKGROUND OF THE INVENTION

Commonly, a storage rack of the type noted above has multiple bays and multiple tiers and comprises horizontally spaced, upright frames including upright columns, cross braces, and support beams. The support beams extend horizontally between the upright columns, at the front of the storage rack and at the back thereof, in vertically spaced pairs. The beams of each are adapted to support a pallet load on their upper edges.

In designs in widespread use, each support beam is formed from sheet steel in one piece or two pieces and is welded so as to have a hollow, tubular profile. Generally, the beam profile is rectangular except for a ledge, which has defined a horizontal surface facing upwardly and a vertical surface facing inwardly. In each pair of support beams, the ledges are adapted to support a wooden or steel deck or spaced wooden or steel braces, which is or are omitted in some installations. Storage racks comprising support beams according to these designs are available commercially from Unarco Material Handling (now a division of UNR Industries, Inc.) of Chicago, Ill., under its STURDI-BILT trademark.

Commonly, the beam profile defines a flat, generally vertical, outer surface, on which it is known to apply a label bearing machine-readable indicia, such as bar code indicia, human-readable indicia, such as alpha-numeric indicia, or both so as to assist in inventory management. Also, it is known for such indicia to be directly applied to the outer surface of the support beam, as by stenciling. Usually, it is not effective to apply such indicia to generally horizontal surfaces of such a beam, since such surfaces tend to be partially or completely obscured by pallet loads. Ordinarily, if bar code indicia are applied, a bar code reading wand is used to read such indicia.

Whether such indicia are applied via a label or directly, it can be very difficult for a person standing on a support surface or sitting on a lift truck to read such indicia applied to such an outer surface of a support beam, particularly if the support beam is located at a high or low elevation relative to the person. If such indicia are bar code indicia, such difficulty is exacerbated, since it is desirable if not necessary to point a bar code reading wand along a generally perpendicular line of sight to a surface marked with bar code indicia for such indicia to be effectively read.

These storage racks are often used in a warehouse where such a rack is located next to a wall or such racks are placed in a back-to-back configuration. If a fire occurs, all of the loads stored on the racks may be burned and damaged since the fire can spread easily due to the close proximity of the racks. To prevent this, warehouses use fire extinguishing systems. These systems commonly comprise fire extinguishers located in close proximity to the loads. However, a significant problem with such a system is that the rack beams are usually within the spray patterns created by the fire extinguishing devices and only serve to deflect the fire extinguishing fluid off of the loads.

One aspect of this invention is addressed to a perceived need for a support beam providing a better way to apply such indicia so that such indicia can be easily read if the support beam is at a high or low elevation relative to such a person. Another aspect of this invention is addressed to a need for a support beam that provides a better way to extinguish a fire in a burning load.

SUMMARY OF THE INVENTION

This invention provides a support beam enabling such applied indicia to be easily read if the support beam is disposed above a support surface, at a high or low elevation relative to a person standing on the support surface or sitting on a lift truck supported by the support surface. This invention enables such a person to have a line of sight generally perpendicular to the beam surface bearing such applied indicia. This invention also provides a support beam that enables a fire to be extinguished quickly.

In one contemplated form, the support beam has an outer wall defining a generally flat, indicia-receiving surface facing outwardly. The indicia-receiving surface is inclined at an angle in a range from about 10° to about 80° relative to a vertical plane, preferably in a range from about 30° to about 60° relative to a vertical plane. Being inclined at such an angle, the indicia-receiving surface enables a person who is standing on the support surface, or who is sitting on a lift truck supported by the support surface, to have a line of sight generally perpendicular to the indicia-receiving surface. The support beam may be generally tubular in cross-section or have a channel profile.

Preferably, the support beam includes an inner wall defining a ledge having a surface facing upwardly and a surface facing inwardly. So as to enable such applied indicia to be easily read at a high elevation, the indicia-receiving surface may face outwardly and downwardly at an angle within the range noted above. So as to enable such applied indicia to be easily read at a low elevation, the indicia-receiving surface may face outwardly and upwardly at such an angle.

This invention contemplates that the outer wall may define a series of generally flat, indicia-receiving surfaces, each facing outwardly and being inclined at an angle in a range from about 10° to about 80° relative to a vertical plane. The outer wall may define two such surfaces defining an obtuse angle relative to each other, namely an upper surface inclined at an angle in a range from about 10° to about 70° relative to a vertical plane and a lower surface inclined at an angle in a range from about 20° to about 80° relative to a vertical plane.

In a preferred example, the upper surface is inclined at an angle in a range from about 10° to about 45° relative to a vertical plane, and the lower surface is inclined at an angle from about 45° to about 80° relative to a vertical plane. Being inclined at such angles, the indicia-receiving surfaces enable a person who is standing on the support surface, or who is sitting on a lift truck supported by the support surface, to have a line of sight generally perpendicular to at least one of the indicia-receiving surfaces.

Rather than a generally flat, indicia-receiving surface, the tubular profile may have a top edge and a bottom edge and may include an outer wall connecting the top and bottom edges and defining a generally arcuate, indicia-receiving surface. So as to provide sufficient space for the applied indicia, such surface has a peripheral measurement equal at least to approximately one third of the peripheral measurement along the outer wall between the top and bottom edges. Again, the indicia-receiving surface enables a person who is standing on the support surface, or who is sitting on a lift truck supported by the support surface, to have a line of sight generally perpendicular to the indicia-receiving surface.

The curved or inclined indicia receiving surface also allows a fire or a burning load to be extinguished quickly when the support beam is used with a properly positioned fire extinguishing device. Ideally, the fire extinguishing device is located at the same elevation as the curved or inclined surface of the support beam. When a fire extinguishing fluid is discharged from the fire extinguisher, the fluid impinges off of the curved or inclined surface and directly onto the load. The fire extinguisher may include a deflector to direct more fluid towards the inclined or curved surface.

These and other objects, features, and advantages of this invention are evident from the following description of several embodiments of this invention with reference to the accompanying drawings.

BRIEF DESCRIPTION OF THE DRAWINGS

FIG. 3, 4, 5, 6, 7 and 8 respectively are cross-sectional views of support beams constituting alternative embodiments of this invention.

FIG. 9 is a cross-sectional view of a pair of support beams according to another alternative embodiment of this invention. A pallet load supported thereon is shown fragmentarily.

FIG. 10 is a cross section view of a support beam according to another alternative embodiment of this invention. A pallet load supported thereon is shown fragmentarily.

FIG. 12 is a simplified, elevational view of two storage racks next to a wall. A fire extinguisher is mounted to the wall and is shown with the extinguisher discharging a fire extinguishing fluid.

FIG. 13 is an enlarged view of the fire extinguisher support beam of the present invention shown in FIG. 12. A representative, simplified spray pattern that is created during the discharge of the fire extinguisher is shown by the lines.

FIG. 14 is a simplified view of a prior art support beam being used in combination with a fire extinguisher that is being discharged. A representative, simplified spray pattern that is created during the discharge is shown by the lines.

FIG. 15 is a cross-sectional view of a support beam according to alternative embodiment of this invention.

DETAILED DESCRIPTION OF ILLUSTRATED EMBODIMENTS

Figure 1:
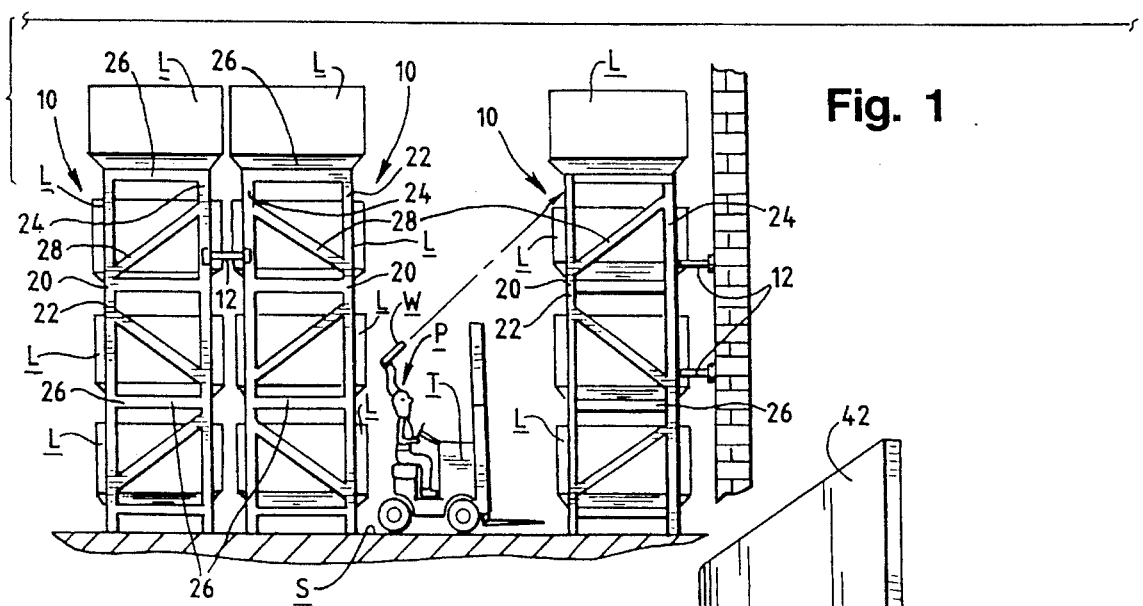
FIG. 1 is a simplified, elevational view of several storage racks and a person sitting on a lift truck and using a wand to read machine-readable indicia on a support beam of one of the storage racks. The support beam having the indicia being read is at a high elevation relative to the person.

As shown in FIG. 1, three storage racks 10 are supported on and by a support surface S, which is a warehouse floor. One such rack 10 is spaced from the other racks 10 by a wide aisle and is tied to a warehouse wall by known braces 12. The latter racks 10 are tied to each other by known braces 12 (one shown) in a back-to-back relationship. As shown in FIG. 1, a person P riding on a lift truck T is holding a bar code reading wand W, which is used to read machine-readable indicia, such as bar code indicia, on support beams to be later described. A line of sight from the wand W to a support beam at a high elevation relative to the person is shown by an arrow. It is evident that, if such indicia were applied to a generally vertical surface of a support beam at the high elevation, it would be very difficult for the person P using the wand W to read such indicia unless he or she were elevated to a greater height.

Each storage rack 10 is similar to known storage racks in comprising upright frames 20, which include front columns 22, back columns 24, horizontal braces 26, and diagonal braces 28, in welded assemblies, and which include support beams (not shown in FIG. 1) connected between the front columns 22 and between the back columns 24, at different elevations. As in known storage racks, the support beams define multiple bays, each comprising multiple tiers. As shown in FIG. 1, each tier in each bay supports a pallet load L, which comprises a load supported by a pallet.

Figure 11:
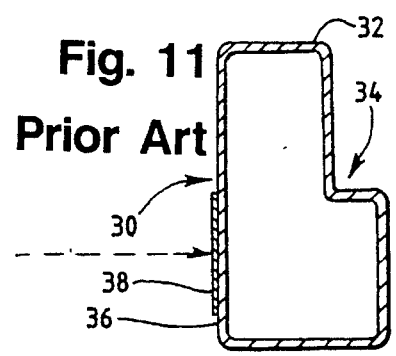
FIG. 11 is a cross-sectional view of a support beam exemplifying prior art.

A support beam 30 of a known design in widespread use is shown in cross-section in FIG. 11. The support beam 30 is formed from sheet steel and is welded along an upper seam 32 so as to have a tubular profile. The tubular profile is shaped so as to define an upper, inner ledge 34, which is adapted to support one edge portion of a wooden or steel deck (not shown) or spaced wooden or steel braces (not shown) in a known manner. The tubular profile defines an outer, generally flat, generally vertical surface 36, on which a label 38 bearing machine-readable indicia, human-readable indicia, or both is applied adhesively. A line of sight, which is generally perpendicular to the label 38, is shown by an arrow.

At intermediate elevations relative to a person seeking to read indicia applied to the support beams, each storage rack 10 may comprise support beams similar to the support beam 30. However, at high elevations relative thereto, each storage rack 10 comprises support beams 40 of a novel design according to this invention.

Figure 2:
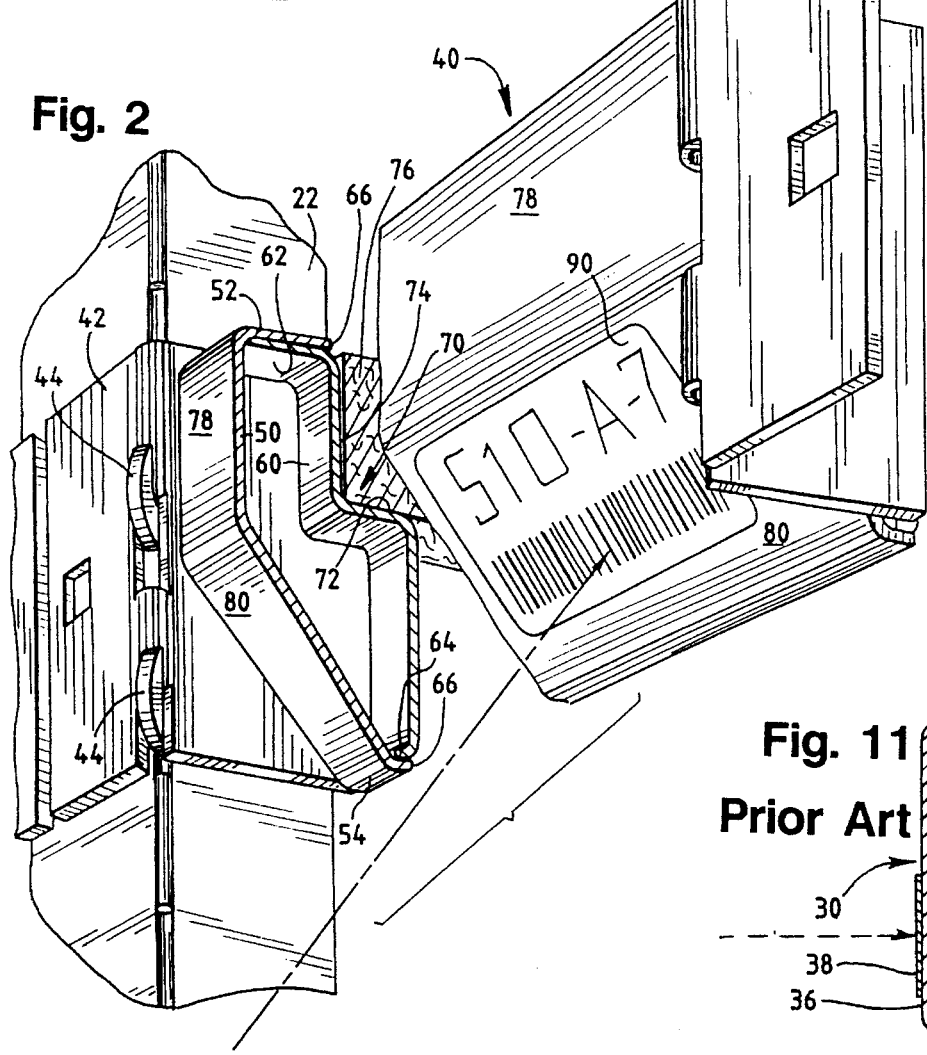
FIG. 2, on a larger scale, is a fragmentary, perspective view of a storage beam bearing a label marked with machine-readable, bar code indicia and with human-readable, alphanumeric indicia and constituting a preferred embodiment of this invention, as associated with a column in a storage rack.

As shown in FIG. 2, each support beam 40 is similar to known support beams, as exemplified by the support beam 30, in having two end flanges 42 welded thereto and differs from such known beams in having a novel profile. The end flange 42 at each end of each support beam 40 is connected to a front or back column of one of the upright frames 20 in a known manner. As shown, the end flanges 42 are connected to two front columns 22 by wedge connectors 44 of a type disclosed in Klein U.S. Pat. No. 4,712,696 or of a type disclosed in Klein U.S. Pat. No. 4,741,445. The end flanges 42 may be alternatively connected thereto by connector bolts (not shown) of a type disclosed in Highsmith U.S. Pat. No. 4,496,061 or of a type disclosed in Klein U.S. Pat. No. 5,020,678.

As shown in FIG. 2, the support beam 40 is formed from sheet steel in two pieces, namely an outer piece 50 having an upper flange 52 and a lower flange 54 and an inner piece 60 having an upper flange 62 and a lower flange 64. The flanges 52, 54, of the outer piece 50 fit over the flanges 62, 64, of the inner piece 60 and are welded to the inner piece 60 at spaced welds 66 along the distal edge of each of the flanges 52, 54 so as to provide the support beam 40 with a tubular profile. Thus, the upper flange 52 of the outer piece 50 defines an upper edge of the support beam 40. Also, the lower flange 54 of the outer piece 50 defines a lower edge of the support beam 40.

The inner piece 60 provides an inner wall shaped so as to define a ledge 70 having a generally horizontal surface 72 facing upwardly and a generally vertical surface 74 facing inwardly. The ledge 70 is adapted to support one end portion 76 of a wooden deck extending between the support beam 40 and the ledge of a similar beam (not shown) spaced from the support beam 40. A steel deck (not shown) or spaced wooden or steel braces (not shown) may be alternatively supported by such ledges.

The outer piece 50 provides an outer wall shaped so as to define a generally flat, generally vertical, upper surface 78 facing outwardly and a generally flat, inclined, lower surface 80 facing outwardly and downwardly. The lower surface 80 defines an obtuse angle relative to the upper surface 78. A label 90 bearing machine-readable, bar code indicia and human-readable, alpha-numeric indicia is applied adhesively to the lower surface 80, which may be therefore called an indicia-receiving surface. A line of sight, which is generally perpendicular to the label 90, is shown by an arrow. Because the indicia-receiving surface 80 is inclined so as to face outwardly and downwardly, the support beam 40 can be advantageously used at a high elevation relative to a person seeking to read such indicia. This invention enables such a person standing on the support surface S or sitting on a lift truck supported by the support surface S to have a generally perpendicular line of sight to the indicia-receiving surface 80.

According to this invention, the indicia-receiving surface 80 is inclined at an angle in a range from about 10° to about 80° relative to a vertical plane, preferably an angle in a range from about 30° to about 60° relative thereto. As shown, such surface 80 is inclined at an angle of approximately 40° relative to a vertical plane. It is desirable to select the angle to optimize readability of the indicia borne by the label 90 at the elevation where the support beam 40 is employed.

As shown in FIG. 3, a support beam 100 constitutes an alternative embodiment of this invention. The support beam 100 is formed from sheet steel in one piece and is welded at an upper seam 102 so as to have a tubular profile. The tubular profile includes an inner wall 104 shaped so as to define a ledge 106 similar to the ledge 40 of the support beam 40.

Furthermore, the tubular profile of the support beam 100 includes an outer wall 110 having a top edge or load supporting surface 112 and a bottom edge 114, at which the outer wall 110 and the inner wall 104 merge. The outer wall 110 is shaped so as to define a generally flat, upper surface 116 facing outwardly and a generally arcuate, lower, indicia-receiving surface 118 merging with the upper surface 116. A label 120 bearing machine-readable indicia, human-readable indicia, or both is applied adhesively to the surface 118.

So as to provide sufficient space for the label 120 bearing such indicia, the indicia-receiving surface 118 has a peripheral measurement equal at least to approximately one third of the peripheral measurement along the outer wall 110, between the edges 112, 114. As shown, the indicia-receiving surface 118 has a peripheral measurement equal to approximately two-thirds of the peripheral measurement along the outer wall 110, between the edges 112, 114. The peripheral measurements are made along the tubular profile. Several possible lines of sight, each of which is perpendicular to the label 120 where it intersects the label 120, are shown by arrows. Because the indicia-receiving surface 118 is generally arcuate and faces outwardly and downwardly, as shown, the support beam 100 can be advantageously used at a high elevation relative to a person seeking to read indicia borne by the label 120, in one of the storage racks 10. This invention enables such a person standing on a support surface below the support beam 100 or sitting on a lift truck supported by the support surface to have a generally perpendicular line of sight to the indicia-receiving surface 118.

As shown in FIG. 4, a support beam 130 constitutes another alternative embodiment of this invention. The support beam 130 is formed of sheet steel in one piece and is welded at an upper seam 132 so as to have a tubular profile, which is similar to the tubular profile of the support beam 100, except as shown and described herein. As shown, the tubular profile includes an inner wall 134 shaped so as to define a ledge 136 similar to the ledges noted above. Moreover, the tubular profile of the support beam 130 includes an outer wall 140 defining a generally flat, upper surface 142 facing outwardly, a generally flat surface 144 merging with the surface 142 and facing outwardly and downwardly, and a generally flat surface 146 merging with the surface 144 and facing outwardly and downwardly. The surface 146 is disposed below the surface 144. The surfaces 144, 146, define an obtuse angle relative to each other. Two similar labels 150 bearing machine-readable indicia, human-readable indicia, or both are applied adhesively. One such label 150 is applied to the intermediate surface 144. The other label 150 is applied to the lower surface 146. The surfaces 144, 146 may be therefore called indicia-receiving surfaces. Two lines of sight, each of which is generally perpendicular to a different one of the labels 150, are shown by arrows.

The indicia-bearing surface 144 is inclined at an angle in a range from about 10° to about 70° relative to a vertical plane, preferably in a range from about 10° to about 45° relative thereto. As shown, the surface 144 is inclined at angle of about 12° relative to a vertical plane. The indicia-bearing surface 146 is inclined at an angle in a range from about 20° to about 80° relative to a vertical plane, preferably at an angle in a range from about 45° to about 80° relative thereto. As shown, the lower surface 146 is inclined at an angle of about 58° relative to a vertical plane. As shown, the surfaces 146, 148, define an angle of about 134° relative to each other. Being inclined at such angles, the indicia-receiving surfaces 144, 146, enable a person standing oh a support surface or sitting on a lift truck supported by the support surface to have a generally perpendicular line of sight to at least one of those surfaces 144, 146.

As shown in FIG. 5, a support beam 150 constitutes yet another alternative embodiment of this invention. The support beam 150 is formed of sheet steel in one piece and is welded at an upper seam 152 so as to have a tubular profile, which is similar to the tubular profile of the support beam 100, except as shown and described herein. The tubular profile of the support beam 150 includes an inner wall 154 shaped so as to define a ledge 156 similar to the ledges noted above.

As shown, the tubular profile of the support beam 150 is shaped so as to have an outer wall 160 defining a generally flat, upper surface 162 facing outwardly and a generally flat, lower indicia-receiving surface 164 facing outwardly and downwardly. A label 170 bearing machine-readable indicia, human-readable indicia, or both is applied adhesively to the surface 164.

According to this invention, the indicia-bearing surface 164 is inclined at an angle in a range from about 10° to about 80° relative to a vertical plane, preferably in a range from about 30° to about 60° relative thereto. As shown, such surface 164 is inclined at an angle of about 30° relative to a vertical plane. Because such surface 164 is inclined at such an angle, the support beam 150 is useful generally where the support beam 40 is useful.

Moreover, the inner wall 154 is shaped so as to define a generally flat surface 172 facing inwardly, below the ledge 156, and so as to define a generally flat surface 174 facing inwardly and upwardly, below the surface 172. The surface 174 is inclined at an angle similar to the angle (e.g., about 30° relative to a vertical plane, as shown) at which the indicia-receiving surface 164 is inclined. The tubular profile of the support beam 150 compensates for beam strength loss that would be otherwise attributable to the indicia-receiving surface 164 being inclined.

As shown in FIG. 6, a support beam 180 constitutes still another embodiment of this invention. The support beam 180 is similar to the support beam 40 in being formed from sheet steel in two pieces, namely an outer piece 182 having an upper flange 184 defining a load-supporting surface and a lower flange 186 and an inner piece 188 having an upper flange 190 and a lower flange 192. The flanges 184, 186, of the outer piece 182 fit over the flanges 190, 192, of the inner piece 188 and are welded to the inner piece 188 at spaced welds 194 along the distal edge of each of the flanges 184, 186, so as to provide the support beam 180 with a tubular profile. The inner piece 188 provides an inner wall 196 shaped so as to define a ledge 198 similar to the ledges noted above.

The outer piece 182 provides an outer wall 200 shaped so as to define a generally flat, lower surface 202 facing outwardly and a generally flat, inclined, upper surface 204 facing outwardly and upwardly. The upper surface 200 defines an obtuse angle relative to the lower surface 202. A label 210 bearing machine-readable indicia, bar code indicia, or both is applied adhesively to the upper surface 204, which may be therefore called an indicia-receiving surface. A line of sight, which is perpendicular to the label 210, is shown by an arrow. Because the indicia-receiving surface 204 is inclined so as to face outwardly and upwardly, the support beam 180 can be advantageously used at a low elevation relative to a person seeking to read indicia borne by the label 210, in one of the storage racks 10.

According to this invention, the indicia-receiving surface 204 is inclined at an angle in a range from about 10° to about 80° relative to a vertical plane, preferably at an angle in a range from about 30° to about 60° relative thereto. As shown, such surface 204 is inclined at an angle of about 30° relative to a vertical plane. Being inclined at such an angle, such surface 204 enables such a person standing on a support surface or sitting on a lift truck supported by the support surface to have a generally perpendicular line of sight to the indicia-receiving surface 204.

As shown in FIG. 7, a support beam 210 constitutes a further alternative embodiment of this invention. The support beam 210 is similar to the support beam 40 in being formed from sheet steel in two pieces, namely an outer piece 212 having an upper flange 214 defining a load-supporting surface and a lower flange 216 and an inner piece 218 having an upper flange 220 and a lower flange 222. The flanges 214, 216, of the outer piece 212 fit over the flanges 220, 222, of the inner piece 218 and are welded to the inner piece 218 at spaced welds 224 along the distal edge of each of the flanges 214, 216, so as to provide the support beam 210 with a tubular profile. The inner piece 218 provides an inner wall 226 shaped so as to define a ledge 228 similar to the ledges noted above.

As shown, the outer piece 212 provides an outer wall 230 shaped so as to define a generally flat, upper surface 232 facing outwardly and a generally flat, lower, indicia-receiving surface 234 facing downwardly and outwardly. A label 240 bearing machine-readable indicia, human-readable indicia, or both is applied adhesively to such surface 234.

According to this invention, the indicia-receiving surface 234 is inclined at an angle in a range from about 10° to about 80° relative to a vertical plane, preferably in a range from about 30° to about 60° relative thereto. As shown, such surface 234 is inclined at an angle of about 30° relative to a vertical surface. Because such surface 234 is inclined at such an angle, the support beam 210 is useful where the support beam 40 is useful generally where the support beam 40 is useful.

As shown, the inner wall 226 is shaped so as to define a generally flat surface 248 facing inwardly below the ledge 228, and so as to define a generally flat surface 250 facing inwardly and upwardly, below the surface 248. The surface 250 is inclined at an angle similar to the angle (e.g., about 30° relative to a vertical plane, as shown) at which the indicia-receiving surface 234 is inclined. The tubular profile of the support beam 210 thus compensates for beam strength loss that would be otherwise attributable to the indicia-receiving surface 234 being inclined.

As shown in FIG. 8, a support beam 250 constitutes a further alternative embodiment of this invention. The support beam is formed from sheet steel so as to have an outer wall 252 having an upper flange 254 and an inner wall 256 having an upper flange 258 defining a load-supporting surface. The upper flange 258 of the inner wall 256 fits over the upper flange 254 of the outer wall 252 and is welded to the flange 254 at spaced welds 260 along the distal edge of the flange 258 so as to provide the support beam 250 with a tubular profile. The inner wall 256 is shaped so as to define a ledge 262 similar to the ledges noted above.

As shown, the outer wall 252 is shaped so as to define a generally flat, upper surface 264 facing outwardly and a generally flat, lower, indicia-receiving surface 266 facing downwardly and outwardly. A label 269 bearing machine-readable indicia, human-readable indicia, or both is applied adhesively to such surface 266. A line of sight, which is generally perpendicular to the label 269, is shown by an arrow.

According to this invention, the indicia-receiving surface 266 is inclined at an angle in a range from about 10° to about 80° relative to a vertical plane, preferably in a range from about 30° to about 60° relative thereto. As shown, such surface 266 is inclined at an angle of about 42° relative to a vertical plane. Because such surface 266 is inclined at such an angle, the support beam 250 is useful generally where the support beam 40 is useful.

As shown in FIG. 9, a pallet L' is supported on a pair of support beams 270 according to yet another embodiment of this invention. Each support beam 270 is formed from sheet steel in one piece so as to have a tubular, generally rectangular profile. Such profile defines an upper, relatively narrow wall 272, a lower, relatively narrow wall 274, an outer, relatively wide wall 276, and an inner, relatively wide wall 278. Each support beam 270 has a welded seam 280 along its upper wall 272.

At each end, each support beam 270 is welded to an end flange 282, which is similar to the end flanges 42. Each end flange 282 is connected to a front or back column 284 Of an upright frame of a storage rack, by a wedge connector 286 similar to the wedge connectors 44.

Each support beam 270 is oriented so that the pallet load L' is supported on a rounded corner or load-supporting surface where its upper wall 272 and its inner wall 278 adjoin, and so that its outer wall 276 has an outer surface 288 facing outwardly and downwardly, as shown. On one support beam 270, a label 290 bearing machine-readable indicia, human-readable indicia, or both is applied adhesively to its outer surface 288, which may be therefore called an indicia-receiving surface. A line of sight, which is generally perpendicular to the label 290, is shown by an arrow. A similar label (not shown) may be adhesively applied to the outer wall 276 of the other beam 270.

According to this invention, the indicia-receiving surface 288 is inclined at an angle in a range from about 10° to about 80° relative to a vertical plane, preferably in a range from about 30° to about 60° relative thereto. As shown, such surface 288 is inclined at an angle of approximately 15° relative to a vertical plane. Because such surface 288 is inclined at such an angle, the support beam 270 is useful generally where the support beam 40 is useful.

As shown in FIG. 10, a support beam 300 constituting still another embodiment of this invention is used with another support beam (not shown) to support a pallet load L". The support beam 300 is similar to each support beam 270, except that the support beam is formed with a generally horizontal, load-supporting wall or surface 302 between its upper wall 304, which is narrower than the upper wall 272 of each support beam 270, and its inner wall 306, which is narrower than the inner wall 278 of each support beam 270. The wall or surface 302 includes a welded seam 308.

Also, the support beam 300 is similar to each support beam 270 in having an outer wall 310 with an outer surface 312 facing outwardly and downwardly, as the outer surface 288 of the outer wall 276 of each support beam 270 faces outwardly and downwardly. A label 320, which is similar to the adhesive label 290, is applied adhesively to the outer surface 312, which may be therefore called an indicia-receiving surface. The label 320 bears machine-readable indicia, human-readable indicia, or both. A line of sight, which is generally perpendicular to the label 320, is shown by an arrow.

The support beam 400, as illustrated in FIG. 15, constitutes an alternate embodiment of the present invention. In this embodiment, the support beam 400 is preferably used with another support beam to support a lightweight load since the support beam 400 has an open channel (non-tubular) profile. The support beam 400 is formed from a steel channel with a single bend in its outer wall, as shown, by cold forming or hot rolling.

The channel profile of the support beam 400 is shaped so as to have an upper, generally flat, horizontal load-supporting surface or flange 402 for supporting a load thereon, a generally vertical surface or flange 404 extending downwardly from a front edge of the upper surface 402, a generally flat, lower indicia-receiving surface 406 facing outwardly and downwardly and extending from the bottom edge of the vertical surface 404, and a lower, generally flat surface or flange 408 extending generally upwardly and backwardly from the bottom edge of the indicia-receiving surface 406. A label 410 bearing machine-readable indicia, human-readable indicia, or both, is applied adhesively to the surface 406.

The indicia-receiving surface 406 is inclined at an angle from about 10° to about 80° relative to a vertical plane, preferably in a range from about 30° to about 60° relative thereto. As shown, such surface 406 is inclined at an angle of approximately 55° relative to a vertical plane. Because such surface 406 is inclined at such an angle, the support beam 400 is useful generally where the tubular support beams of the previous embodiments are useful.

A characteristic feature of each of the foregoing embodiments is a load-receiving surface for supporting a load thereon. Another characteristic feature of each of the foregoing is an indicia-receiving surface enabling machine-readable indicia, human-readable indicia, or both, at a high or low elevation relative to a person seeking to read such indicia to be easily read.

Turning now to FIGS. 12 and 13, another advantage presented by the novel support beam 250 is shown. When the support beam 250 is used with a properly positioned fire extinguisher 330 of well known construction, the beam 250 allows more fire extinguishing fluid 332, such as water, to be deflected onto a burning load L due to the novel shape of the support beam 250 when compared with a prior art support beam. Since more fluid 332 is deflected onto the load L, the fire is extinguished more quickly than if a prior art beam were used. This advantage can be achieved with any of the embodiments shown in FIGS. 2–10 and 15.

To achieve this superior fluid spray pattern 332, the fire extinguisher 330 should be placed at generally the same elevation as the support beam 250 in generally close proximity to the inclined or curved surface 266. This placement forces the fluid 332 that is discharged from the fire extinguisher 330 to impinge upon the inclined or curved surface 266 of the support beam 250 and spray on the load L as illustrated in FIGS. 12 and 13. Since the support beam 250 is open beneath (or above if the embodiment of FIG. 6 is being used), that is, no structure is in the way of the spray pattern, the fluid 332 falls freely and fully onto the supported load L. This placement also prevents the fire extinguisher 330 from being struck by a load L, which could damage or accidentally discharge the fire extinguisher 330, when the operator is placing the load L onto the rack.

The fire extinguisher 330 may be mounted on a wall W in an upright or sidewall condition. If the racks are placed in a side-by-side configuration, a pipe (not shown) having fire extinguishing devices (not shown) may extend from the floor or from the ceiling at a location between the racks. Generally, at least one fire extinguisher 330 is associated with one support beam 250. Thus, several fire extinguishers will be mounted along a wall or along the pipe.

The fire extinguisher 330 may include a deflector 334, also of well known construction, to deflect even more fluid 332 onto the inclined or curved surface 266. The deflector 334 is mounted on the fire extinguisher 330 at a position where the deflector 334 deflects the most amount of fluid 332 onto the inclined or curved surface 266. For example, in FIGS. 12 and 13, the deflector 334 is mounted by conventional means on the bottom end of the fire extinguisher 330.

As shown in FIG. 14, a prior art support beam 30, as illustrated in FIG. 11, would not achieve a similar fluid spray pattern 336 to the one created with the novel structure of the present invention. Since the outer surface 36 of the prior art beam 30 is not inclined or curved, the majority of the fluid 336 that is discharged from the extinguisher 330 would be deflected back towards the wall. If a deflector 334 is not used on this prior art beam, some fluid 336 may spray onto the load L̲, however, the quantity of fluid 336 will be small in comparison to the quantity of fluid 332 that is sprayed onto the load L̲ when using the novel support beam, for example, 250, of the present invention.

Herein, the term indicia-receiving surface refers to the inclined or curved surface illustrated in the drawings and described above, whether or not any indicia are applied to such surface via a label or otherwise.

Various modifications may be made in the foregoing embodiments without departing from the scope and spirit of this invention.

The invention claimed is:

1. A storage rack positioned on a substantially horizontal surface, on which an aisle is defined next to the storage rack, the storage rack comprising a support beam above the substantially horizontal surface, the support beam being formed from a steel channel, which has an outer wall with an uppermost edge, and a lowermost edge each of said flanges finally, being generally perpendicular to the outer wall, the upper flange extending from the uppermost edge of the outer wall and the lower flange extending from the lowermost edge of the outer wall, the upper flange having an upper, flat, substantially horizontal, load-supporting surface for supporting a pallet load, the outer wall being shaped with a single bend so that the outer wall has an upper portion extending to the uppermost edge and a lower portion extending to the lowermost edge, and so that the lower portion defines a generally flat, inclined surface inclined at an angle in a range from about 10° to about 80° relative to the upper portion, so that the upper flange remains generally perpendicular to the upper portion of the outer wall, and so that the lower flange remains generally perpendicular to the lower portion of the outer wall, the flanges converging toward each other, the support beam being disposed with the flanges extending away from the aisle and with the inclined surface facing toward the aisle and downwardly and being inclined at said angle relative to a vertical plane.

2. The storage rack of claim 1 wherein indicia are applied to the inclined surface, which is inclined so as to enable a person who is standing on the substantially horizontal surface, or who is sitting on a lift truck supported by the substantially horizontal surface, to have a line of sight generally perpendicular to the inclined surface.

3. The storage rack of claim 1 wherein the inclined surface is inclined at an angle in a range from about 30° to about 60° relative to the vertical plane.

* * * * *

UNITED STATES PATENT AND TRADEMARK OFFICE
CERTIFICATE OF CORRECTION

PATENT NO. : 5,526,945

DATED : June 18, 1996

INVENTOR(S) : William L. Clark

It is certified that error appears in the above-indentified patent and that said Letters Patent is hereby corrected as shown below:

On the title page item [75], William T. Guiher should be deleted.

Signed and Sealed this

Fifteenth Day of October, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,526,945
DATED : June 18, 1996
INVENTOR(S) : Clark et al.

It is certified that error appears in the above-indentified patent and that said Letters Patent is hereby corrected as shown below:

Title page, item [54] Col. 1, line 2, "INCLINDED" should read --INCLINED--.

In column 1, line 41, after "each", --pair-- should be inserted.

In column 4, line 6, before "support", --and-- should be inserted.

In column 4, line 14, before "alternative", --an-- should be inserted.

In column 6, line 56, before "angle", --an-- should be inserted.

In column 6, lines 44, 46, 47, and 50, "150" should be --146--.

In column 7, line 53, "200" should be --204--.

UNITED STATES PATENT AND TRADEMARK OFFICE
CERTIFICATE OF CORRECTION

PATENT NO. : 5,526,945
DATED : June 18, 1996
INVENTOR(S) : Clark et al.

It is certified that error appears in the above-indentified patent and that said Letters Patent is hereby corrected as shown below:

Col. 11, line 29, after "beam", —and an upright frame supporting the support beam— should be inserted.

Column 12, line 1, after "edge", —, an upper flange, and a lower flange,— should be inserted.

Column 12, line 2, "finally," should be deleted.

Signed and Sealed this

Eleventh Day of February, 1997

Attest:

BRUCE LEHMAN

Attesting Officer     Commissioner of Patents and Trademarks

UNITED STATES PATENT AND TRADEMARK OFFICE
Certificate

Patent No. 5,526,945                                              Patented: June 8, 1996

On petition requesting issuance of a certificate of inventorship pursuant to 37 C. F. R. § 148(b), it has been found that the above-identified patent improperly sets forth the inventorship.

Accordingly, it is hereby certified that the correct inventorship of this patent is: William L. Clark.

Signed and Sealed this Twenty-sixth Day of August, 1997.

LESLIE A. BRAUN
*Supervisory Patent Examiner*
Patent Examining Art Unit 3505